US007765177B2

(12) United States Patent
Stakutis et al.

(10) Patent No.: US 7,765,177 B2
(45) Date of Patent: *Jul. 27, 2010

(54) METHOD, SYSTEM AND PROGRAM FOR ARCHIVING FILES

(75) Inventors: Christopher John Stakutis, Concord, MA (US); William Robert Haselton, Peabody, MA (US); Kevin Michael Stearns, Maynard, MA (US); Alan L. Stuart, Scarsdale, NY (US); Toby Lyn Marek, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 11/465,594

(22) Filed: Aug. 18, 2006

(65) Prior Publication Data

US 2006/0282484 A1   Dec. 14, 2006

Related U.S. Application Data

(63) Continuation of application No. 10/681,558, filed on Oct. 7, 2003, now Pat. No. 7,146,388.

(51) Int. Cl.
*G06F 7/00* (2006.01)
(52) U.S. Cl. .......................................... 707/1; 707/203
(58) Field of Classification Search ................. 707/204, 707/200, 1, 203; 713/193
See application file for complete search history.

(56) References Cited

U.S. PATENT DOCUMENTS

| 4,899,299 A | 2/1990 | MacPhail |
| 5,051,891 A | 9/1991 | MacPhail |
| 5,107,419 A | 4/1992 | MacPhail |
| 5,132,954 A | 7/1992 | Kulakowski et al. |
| 5,144,556 A | 9/1992 | Wang et al. |
| 5,146,561 A | 9/1992 | Carey et al. |
| 5,233,576 A | 8/1993 | Curtis et al. |
| 5,276,867 A | 1/1994 | Kenley et al. |

(Continued)

FOREIGN PATENT DOCUMENTS

EP   0947932   10/1999

(Continued)

OTHER PUBLICATIONS

Daniel Abadi, Samuel Madden, Wolfgang Lindner, Reed Robust Efficient Filtering and Event Detection in Sensor Networks, Aug. 2005, ACM, pp. 769-780.*

(Continued)

*Primary Examiner*—Mohammad Ali
*Assistant Examiner*—Donald Lawson
(74) *Attorney, Agent, or Firm*—David W Victor; Konrad Raynes & Victor LLP

(57) ABSTRACT

Provided are a method, system, and program for archiving files. A hierarchical file system having directories is provided. An archival retention policy is associated with at least one of the directories in the hierarchical file system, wherein the retention policy applies to files included in the associated directory, and wherein the retention policy specifies a retention time indicating a time period during which a file is subject to the retention policy.

23 Claims, 6 Drawing Sheets

U.S. PATENT DOCUMENTS

| | | | |
|---|---|---|---|
| 5,438,661 A | 8/1995 | Ogawa | |
| 5,457,796 A | 10/1995 | Thompson | |
| 5,463,772 A | 10/1995 | Thompson et al. | |
| 5,495,603 A | 2/1996 | Fruchtman et al. | |
| 5,495,607 A | 2/1996 | Pisello et al. | |
| 5,506,986 A | 4/1996 | Healy | |
| 5,678,042 A | 10/1997 | Pisello et al. | |
| 5,689,699 A | 11/1997 | Howell et al. | |
| 5,813,009 A | 9/1998 | Johnson et al. | |
| 5,925,126 A | 7/1999 | Hsieh | |
| 5,983,239 A | 11/1999 | Cannon | |
| 5,991,753 A | 11/1999 | Wilde | |
| 6,185,576 B1 | 2/2001 | McIntosh | |
| 6,240,421 B1 | 5/2001 | Stolarz | |
| 6,266,679 B1 * | 7/2001 | Szalwinski et al. | 707/204 |
| 6,272,086 B1 | 8/2001 | Jaquette et al. | |
| 6,286,013 B1 | 9/2001 | Reynolds et al. | |
| 6,321,219 B1 | 11/2001 | Gainer et al. | |
| 6,324,569 B1 | 11/2001 | Ogilvie et al. | |
| 6,336,120 B1 | 1/2002 | Noddings et al. | |
| 6,438,642 B1 | 8/2002 | Shaath | |
| 6,519,679 B2 | 2/2003 | Devireddy et al. | |
| 6,546,404 B1 | 4/2003 | Davis et al. | |
| 6,549,916 B1 | 4/2003 | Sedlar | |
| 6,553,365 B1 | 4/2003 | Summerlin et al. | |
| 6,886,020 B1 | 4/2005 | Zahavi et al. | |
| 7,107,416 B2 | 9/2006 | Stuart et al. | |
| 7,146,388 B2 | 12/2006 | Stakutis et al. | |
| 7,392,234 B2 | 6/2008 | Shaath et al. | |
| 6,330,572 B1 | 12/2009 | Sitka | |
| 2001/0044904 A1 | 11/2001 | Berg et al. | |
| 2002/0010708 A1 | 1/2002 | McIntosh | |
| 2002/0046320 A1 | 4/2002 | Shaath | |
| 2002/0049643 A1 | 4/2002 | Church | |
| 2002/0133738 A1 | 9/2002 | Zeigler et al. | |
| 2002/0143598 A1 | 10/2002 | Scheer | |
| 2002/0156767 A1 | 10/2002 | Costa et al. | |
| 2002/0166079 A1 | 11/2002 | Ulrich et al. | |
| 2002/0174329 A1 | 11/2002 | Bowler et al. | |
| 2003/0070071 A1 | 4/2003 | Riedel et al. | |
| 2003/0101072 A1 | 5/2003 | Dick et al. | |
| 2003/0126215 A1 | 7/2003 | Udell et al. | |
| 2003/0182304 A1 | 9/2003 | Summerlin et al. | |
| 2004/0006589 A1 | 1/2004 | Maconi et al. | |
| 2004/0117407 A1 | 6/2004 | Kumar et al. | |
| 2004/0167898 A1 | 8/2004 | Margolus et al. | |
| 2005/0055518 A1 | 3/2005 | Hochberg et al. | |
| 2005/0055519 A1 | 3/2005 | Stuart et al. | |
| 2005/0076066 A1 | 4/2005 | Stakutis et al. | |
| 2006/0282630 A1 | 12/2006 | Hochberg et al. | |
| 2007/0220278 A1 * | 9/2007 | Nixon | 713/193 |
| 2008/0091739 A1 * | 4/2008 | Bone et al. | 707/200 |
| 2009/0119354 A1 | 5/2009 | Stuart et al. | |

FOREIGN PATENT DOCUMENTS

| | | |
|---|---|---|
| JP | 01 276346 | 11/1989 |
| JP | 02 002453 | 1/1990 |
| JP | 04 125743 | 4/1992 |
| JP | 10143407 | 5/1998 |
| JP | 11 007401 | 1/1999 |
| JP | 2001075786 | 3/2001 |
| WO | 0057275 | 9/2000 |
| WO | 0058865 | 10/2000 |
| WO | 02059723 | 8/2002 |

OTHER PUBLICATIONS

IEEE, no. matched results, Aug. 30, 2009, p. 1.*

Sara, Managing Records in Automated Office Systems, 1993, google.com.*

Summary of Art Cited in Counterpart Japanese Office Action dated Dec. 11, 2007.

Summary of Art Cited in Counterpart Chinese Office Action dated Feb. 15, 2008.

US Application entitled "Method, System, and Program for Implementing Retention Policies to Archive Records", IBM Ref. No. SJO920030096US2, Serial No. unknown, filed Aug. 18, 2006, by inventors A.L. Stuart and T.L. Marek.

US Application entitled "Method, System, and Program for Retention Management and Protection of Stored Objects", IBM Ref. No. SJO920030060US2, Serial No. unknown, filed Aug. 18, 2006, by inventors A.H. Hochberg, T.L. Marek, D.M. Cannon, H.N. Martin, D.P. Warren, Jr., and M.A. Haye.

EMC Corporation, "EMC Centera Compliance Edition", 2003, pp. 1-4.

EMC Corporation, "Centera Compliance Edition: Understanding and Addressing the Challenges of Compliance and Disovery", White Paper, Apr. 2003, pp. 1-10.

IT Web, "EMC Centera Compliance Edition Raised Bar for Regulatory Compliance", EMC SA Press RElease on ITWeb, Jun. 23, 2003, pp. 1-2 [retrieved online Sep. 3, 2003] http://www.itweb.co.za/sections/QuickPrint/Print.asp? StoryID=134765.

"Method for Indicating Calendar Entry Which Deletes a Document", Reproduced from RESEARCH DISCLOSURE, May 1993, No. 5, Kenneth Mason Publications, Ltd, England.

"Retention Management Program", Reproduced from RESEARCH DISCLOSURE, May 1993, No. 5, Kenneth Mason Publications, Ltd, England.

* cited by examiner

METHOD, SYSTEM AND PROGRAM FOR ARCHIVING FILES

RELATED APPLICATIONS

This patent application is a continuation of U.S. patent application Ser. No. 10/681,558, filed on Oct. 7, 2003, which patent application is incorporated herein by reference in its entirety.

BACKGROUND OF THE INVENTION

1. Field of the Invention

The present invention is related to a method, system, and program for archiving files.

2. Description of the Related Art

Organizations may need to retain and archive electronic files (where a file comprises a document, record, or any other data structure storing code or data that may be represented in a hierarchical file system) in storage for an extended period of time due to internal corporate requirements or external regulatory or legal requirements. For instance, government regulators may require that certain files remain archived for a minimum period of time. Companies in regulated industries, such as securities and financial organizations, defense contractors, etc., may be required to archive certain documents. Further, government agencies may also be required to archive files. Yet further, organizations subject to a government proceeding, such as litigation, may also be subject to a file retention policy. An organization may also archive documents for backup and storage, and versioning. A storage system often includes some archival software to manage the archival of files at different locations that are retained according to a policy. Such archival software may maintain a database of archived files. Use of the archival software may require significant user training and management, as well as a stand alone application program. Archival software typically features customized graphical user interfaces (GUIs) and application program interfaces (APIs) to interface with the operating system to perform archival related operations.

One archival data storage technology referred to as WORM (for write once, read many) involves archiving data to a storage media, such as optical disks, that can only be written to once. One disadvantage of using optical disks is that their access rates are slow, especially when the disks are maintained in an auto-changer that needs to mechanically access a disk from a slot and insert the accessed disk into a disk drive to access.

To avoid some of the drawbacks of using optical disks, some archival system vendors are using inexpensive hard disk drives as the medium for archiving data. The hard disk drive storage system is sold bundled with software to expose the storage as a proprietary archive utility, requiring custom interfaces and application program interfaces to use the archival features.

SUMMARY OF THE PREFERRED EMBODIMENTS

Provided are a method, system, and program for archiving files. A hierarchical file system having directories is provided. An archival retention policy is associated with at least one of the directories in the hierarchical file system, wherein the retention policy applies to files included in the associated directory, and wherein the retention policy specifies a retention time indicating a time period during which a file is subject to the retention policy.

In further implementations, associating the archival retention policy with one directory comprises indicating a retention policy code in a pathname of the directory.

In further implementations, a request directed to a target file is received and a determination is made as to whether the target file is included within the directory associated with the retention policy. A determination is made as to whether the retention time of the retention policy indicates that the target file is currently subject to retention in response to determining that the target file is included within the directory associated with the retention policy. The retention policy is applied to the target file if the target file is currently subject to the retention policy.

Yet further, the retention policy may comprise a non-rewritable and non-erasable retention policy and wherein the directories and files therein are stored in a magnetic storage medium.

Still further, additional subdirectories may be included in the directory associated with the retention policy such that the retention policy applies to any file within the additional subdirectories.

Yet further, the directory associated with the retention policy is a subdirectory of another directory.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
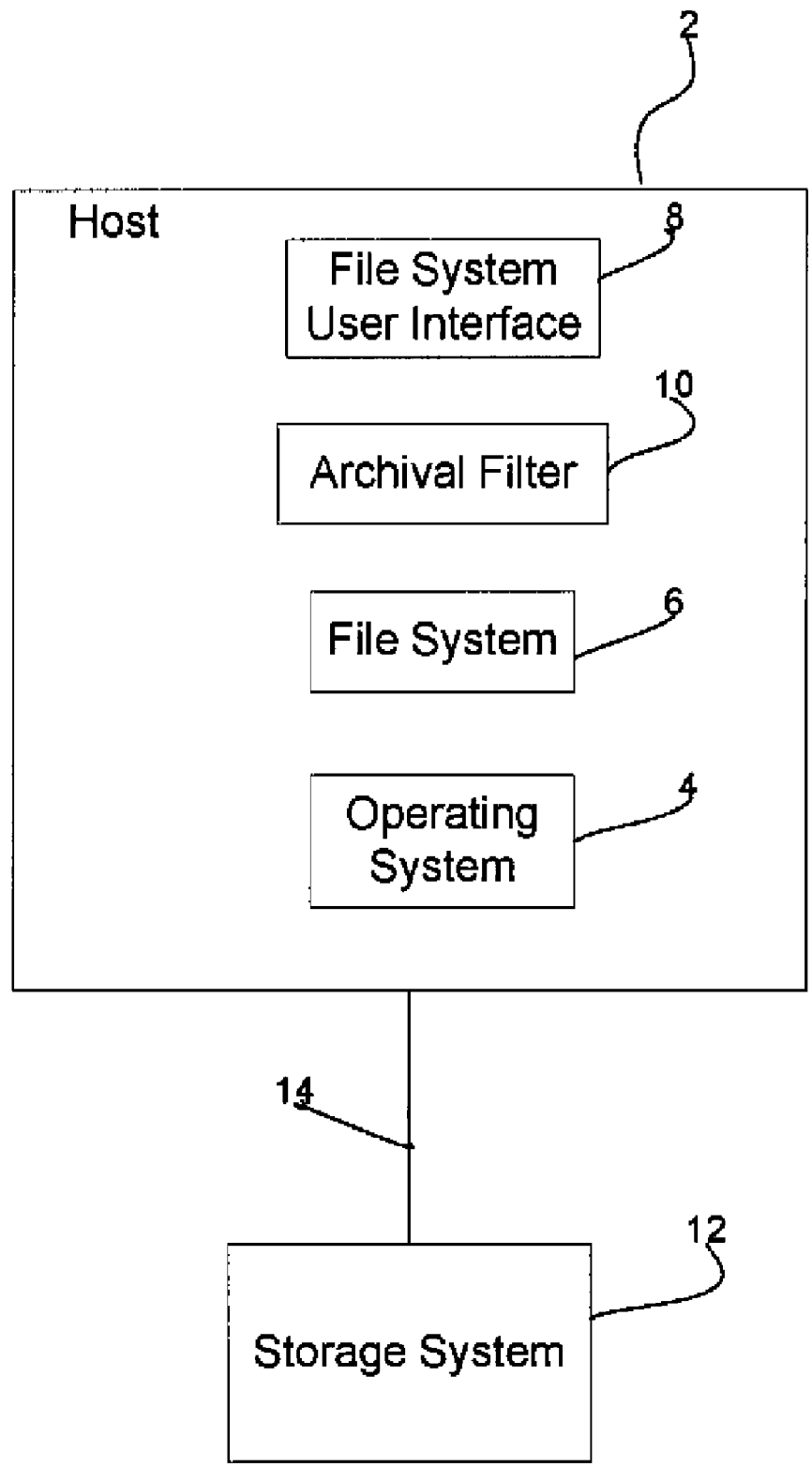
FIG. 1 illustrates a computing environment in which embodiments of the invention are implemented.

FIG. 1 illustrates a computing environment in which embodiments of the invention are implemented. A host system 2 includes an operating system 4 and a file system 6 that provides an organization of files stored in a storage device. The file system 6 may implement a hierarchical tree-like arrangement of files, which may involve the use of directories and subdirectories in which the files or records may be stored, where any directory may comprise a subdirectory of another directory or the root directory. A file system user interface 8 provides a command line or graphical user interface to enable the user to explore the file system and perform file system related operations, such as moving a file to a specified directory, deleting a file, renaming a file, creating a file, etc. The file system user interface 8 may comprise a file management program that renders a presentation of the hierarchical arrangement of files. The file system user interface 8 may comprise a stand-alone file management program or a file management function accessed through an application program.

An archival filter 10 intercepts user file requests generated through the file system user interface 8 directed to the file system 6 and determines whether any archival retention policies should block such user requested operation if necessary or allow the operation to proceed to the file system 6 to execute. The file system 6 may provide access to files stored in the storage system 12 via connection 14.

The host system 2 may comprise any computing device known in the art, such as a server class machine, workstation, desktop computer, etc. The storage system 12 may comprise any storage device known in the art, such one or more interconnected disk drives configured as a Redundant Array of Independent Disks (RAID), Just a Bunch of Disks (JBOD), Direct Access Storage Device (DASD), as a tape storage device, a single or multiple storage units, e.g., a tape library, or etc. The connection 14 may comprise any interface between storage and a host known in the art, such as a network connection (e.g., Ethernet, wireless ethernet, Fibre Channel, etc.) or any other data transfer interface known in the art, e.g., Advanced Technology Attachment (ATA), Serial ATA (SATA), Small Computer System Interface (SCSI), etc., which may be external or internal to the host 2 enclosure.

Figure 2:
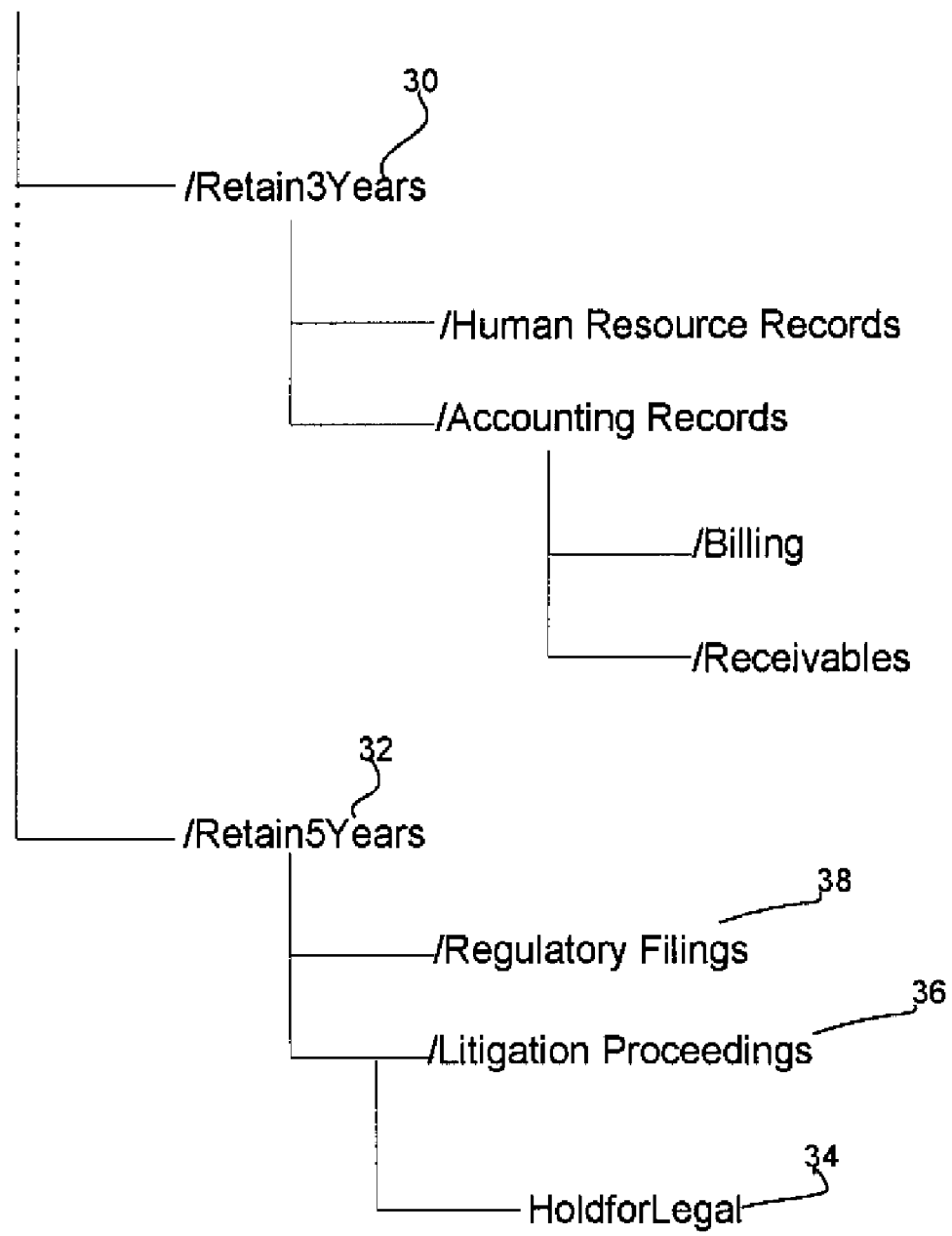
FIG. 2 illustrates an example of an arrangement of a hierarchical file system in accordance with implementations of the invention.

In certain embodiments, the archival filter 10 determines the retention policies based on a pathname of a directory associated with a retention policy. For instance, to indicate that files or records within a directory are to be retained for a specified time period, the user may name a directory "/RetainX", where X specifies a time period, e.g., years, days, months, etc. In certain implementations, the action of "retaining" a file may entail never allowing the file to be modified or updated in any circumstances, and only permitting erase and move operations. The retention policy indicated in the pathname of the directory would apply to any files or records stored within the directory having the retention pathname or any further subdirectory of the directory having the retention name. FIG. 2 illustrates a hierarchical tree file system in which data is organized having two directories 30 and 32. The archival policy specified in the pathnames of the retention directories 30 and 32 may apply to files stored in the retention directories 30 and 32 or any subdirectories defined therein. The user may use the file system user interface 8 to move files to a retention directory, such as by using an input device to "drag and drop" or otherwise move files from one directory to a retention directory 30 and/or 32 so that the retention policy will apply to the moved file.

Another example of a retention policy to use as the pathname is "RetainUntilX", which specifies that files in a retention directory having such a pathname will be retained until the specified date "X".

In this way, the user may use standard file management interfaces to associate a file with a retention policy by just copying or otherwise moving the desired file to a retention directory. With the described embodiments, specialized APIs or customized interfaces are not needed because a standard file management interface is used to specify the retention policies. Moreover, the user can define a retention policy by including descriptive language statements in the directory pathname, which are understood by the archival filter 10, that describe and specify the policy. This avoids the need for substantial training to instruct users on how to apply an archival policy to a file.

FIG. 2 illustrates an example of a hierarchical arrangement of directories, where the pathnames of the directories 30 and 32 provide a file retention policy to apply to all files in that directory. For instance any file within the directory 30 or a subdirectory of directory 30 will be retained for three years. When the date and time associated with a file, i.e., the last modification date, within the directory 30 is three years prior to the current date, then that file in the directory 30 may be deleted or moved without restriction. Similarly, any file in the path of a subdirectory of directory 32 will be retained for five years.

FIG. 2 also provides an example of a "hold" directory 34, which is a subdirectory of the retain directory 36 and litigation proceedings subdirectory 36. Any file moved to the hold directory 34 will not be allowed to be deleted, even after the expiration of the retention period indicated in the pathname of the directory 32. For instance, if certain files may be relevant to an imminent or pending litigation, then a hold directory 34 may be added as a subdirectory of the directory 36 to store files relevant to the litigation to prevent any files moved to the hold directory 34 from being deleted. A regulatory filings directory 38 archives files related to regulatory filings. In certain embodiments, a file in the hold directory 34 may be moved back to the directory from which it originated or another directory after the reason for the hold is no longer relevant.

Figure 3:
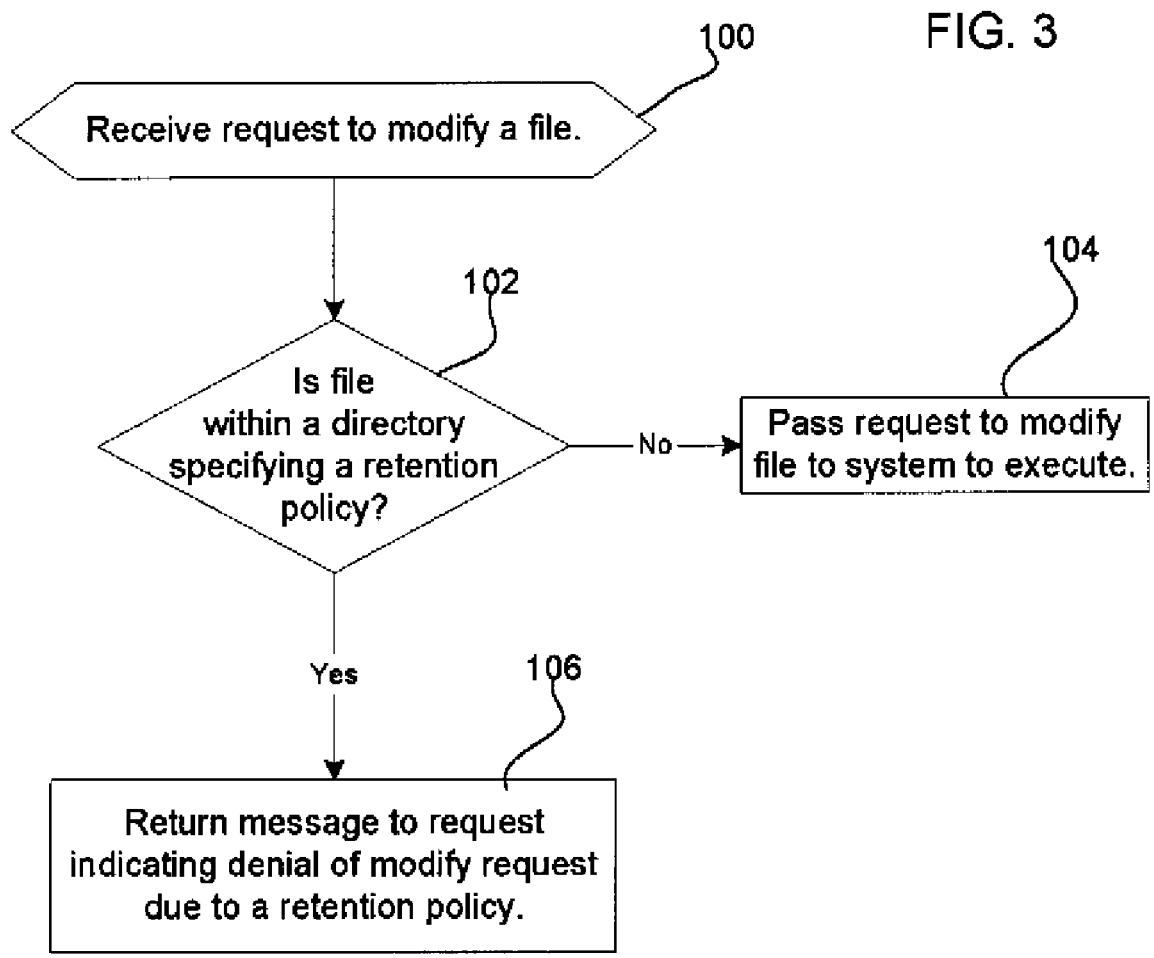
FIGS. 3, 4, and 5 illustrate operations performed to manage archived files in accordance with implementations of the invention.

FIG. 3 illustrates operations performed by the archival filter 10 to determine whether an archive policy applies to an operation to modify a file represented in the file system 6. The archival filter 10 would intercept and process a modify request before the request is sent to the file system 6 to execute. Upon receiving (at block 100) the request to modify the target file, if (at block 102) the target file to modify is not within a retention directory (directly or within a further subdirectory thereof), then the archival filter 10 passes (at block 104) the modify request to the file system 6 to execute. If the target file is within a retention directory, then the archival filter 10 returns (at block 106) a message indicating denial of the erase request due to a retention policy. The message may include additional information such as the specifics of the retention policy and the pathname of the directory including the target file.

With the logic of FIG. 3, any request to modify a file, as opposed to erase the file, may be denied regardless of whether the archival policy applies. This bar on modifying archived files regardless of the retention policy would prevent the situation from occurring where a file whose retention period expired is modified and subsequently subjected to a new archival retention policy. If such modification were allowed, then the new archival policy may be applied when the assumption is that the file subjected to the new archival policy was the previously archived file, not an updated version thereof.

Figure 4:
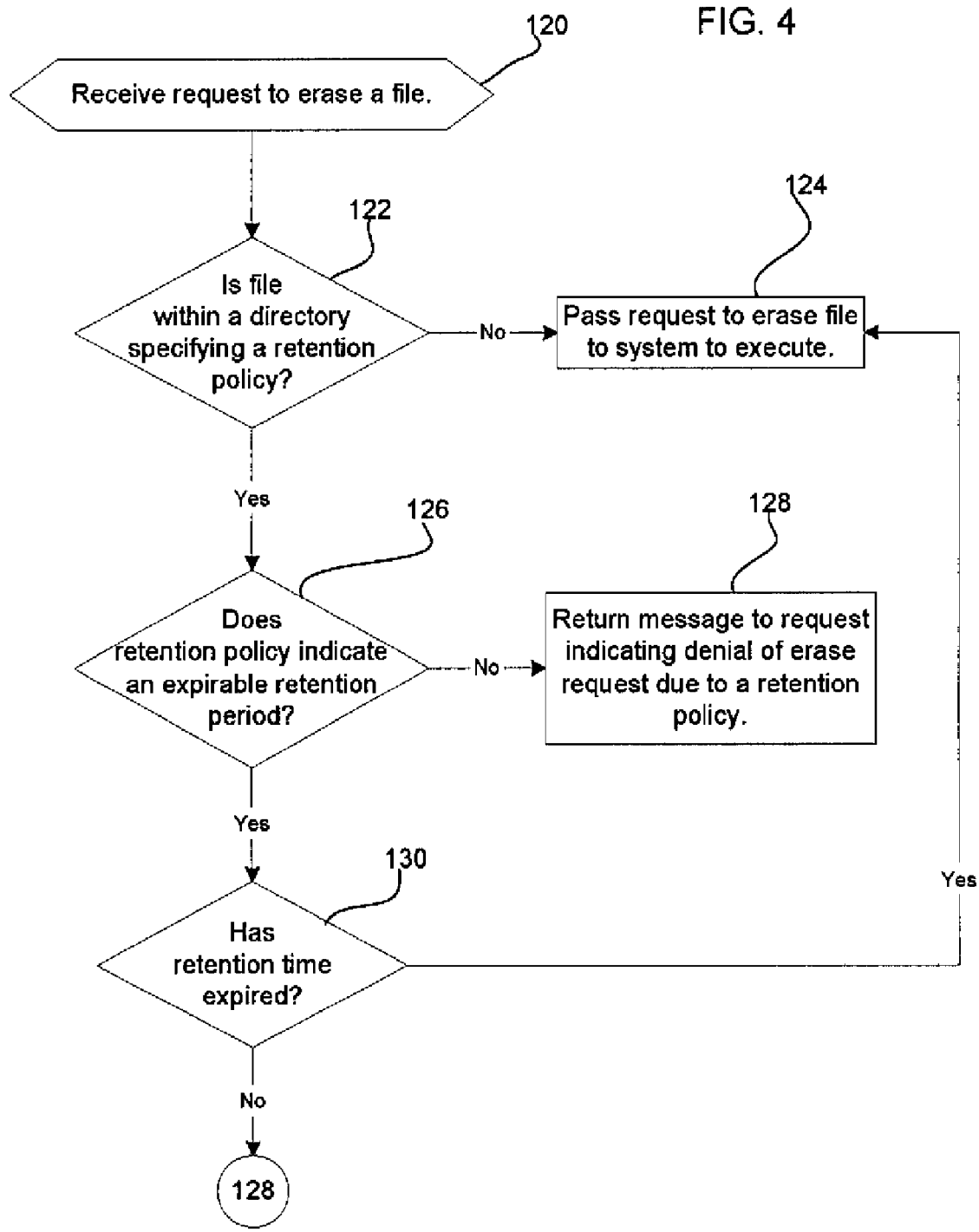

FIG. 4 illustrates operations performed by the archival filter 10 to determine whether an archive policy applies to an operation to erase a file represented in the file system 6. The archival filter 10 would intercept and process an erase request before the request is sent to the file system 6 to execute. Upon receiving (at block 120) the request to erase the target file, if (at block 122) the target file to erase is not within a retention directory (directly or within a further subdirectory thereof), then the archival filter 10 passes (at block 124) the erase request to the file system 6 to execute. If the target file is within a retention directory, then a determination is made (at block 126) as to whether the retention policy specified in the pathname of the directory indicates an expirable retention period. A retention policy that does not expire may be indicated in the directory pathname with "hold", retain forever, etc. If (at block 126) the retention policy does not expire, then the archival filter 10 returns (at block 128) a message indicating denial of the erase request due to a retention policy. The message may include additional information such as the specifics of the retention policy and the pathname of the directory including the target file. If (at block 126) the retention policy is for a defined, i.e., expirable, time period and if (at block 130) the retention period has expired, then control proceeds to block 124 to allow the erase request to proceed. Otherwise, if the retention period has not expired, then control proceeds to block 108 to return the message denying the erase request.

A retention period expires if the time period of the retention policy has been exceeded. For instance, if the retention period specifies a termination date, e.g., "RetainUntil__1/1/05", then the retention period expires on the specific date. Alternatively, if the retention time period specifies a time frame, e.g., "Retain__3Years", then the retention period expires when the current time exceeds the retention time period plus the time the file was created, last modified or added to the retention directory.

With the logic of FIG. 4, an erase operation is not allowed to proceed if a file is within a retention directory and the retention policy has not expired with respect to that target file. Thus, files with different creation/last modification dates may expire at different times according to certain retention policies specified in the directory file name. In this way, the archival filter 10 filters all erase requests. In certain implementations, the archival filter 10 would pass all read requests to the file system 6 to execute.

Figure 5:
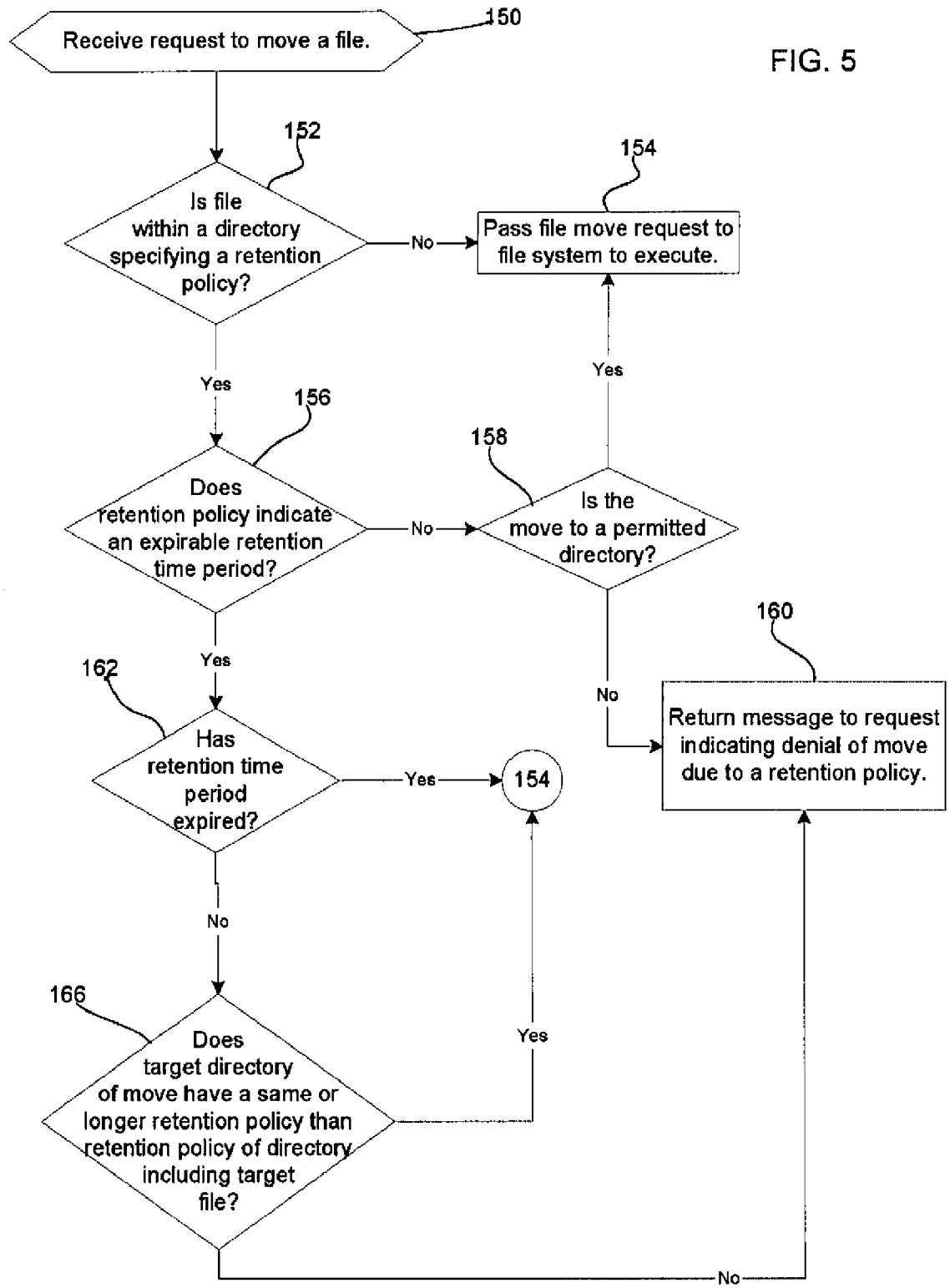

FIG. 5 illustrates operations performed by the archival filter 10 to process a request to move a target file from one directory to another. Upon receiving (at block 150) the request to move the target file, if (at block 152) the file is not within a directory whose file name specifies a retention policy, then the archival filter 10 passes (at block 154) the move request to the file system 6 to execute. If (at block 152) the target file is within a directory associated with a retention policy and if (at block 156) the retention policy does not specify an expirable retention time period, e.g., such as the case with the hold directory 34, then a determination is made (at block 158) whether the move is to a permitted directory. In certain implementations, a permitted target directory may be one whose files are associated with a retention policy that is as long or longer than the retention policy associated with the directory including the hold directory. For instance, in the example of FIG. 2, a file moved from the hold directory 34 would have to be moved to a directory having a retention policy of at least five years. In alternative implementations, a permitted directory may be associated with shorter retention time periods or no retention policies. If (at block 158) the move is to a permitted directory, then control proceeds to block 154 to pass the move command to the file system 6 to execute; otherwise, if the move is not to a permitted directory, then the archival filter 10 causes the return (at block 160) of a message indicating denial of the move due to a retention policy.

If (at block 156) the retention policy does provide an expirable (finite) time period and if (at block 162) the retention time period has expired, e.g., the specified termination date has passed or a termination period from the file date has expired, then control proceeds to block 154 to pass the move request to the file system 6 to execute. Otherwise, if the retention time period has not expired and if (at block 166) the target directory of the move has a same or longer retention policy than the retention policy of the directory currently including the target file, then control proceeds to block 154 to allow the file system 6 to execute the move request. If (at block 166) the target directory has a shorter retention time period than the current directory including the target file, then control proceeds to block 160 to deny the move request.

With the logic of FIG. 5, a file can be moved from a directory associated with a finite retention policy, i.e., one with an expirable time period, if the file is being moved to a directory having at least as long or longer than retention period. For instance, if a file is in a directory having a retain forever retention period, like the hold directory 34 (FIG. 2), then a file in that hold directory may only be moved to another hold directory also having the retain forever retention period. Further, if the file being moved is in a higher level directory, which contains the hold directory, then the file can only be moved to a hold directory within a higher level directory having the same or longer retention period of the higher level directory including the file subject to the move. This ensures that the file initially associated with the retention policy is retained for the specified period even after being moved. In further implementations, there may be a special directory for archived files removed from a retention directory to allow tracking of any files removed from the retention archives.

Certain of the described implementations provide techniques for using a standard file system interface to allow the user to implement a non-re-writable and non-erasable archival system, thereby avoiding the need to install, train for, and use a separate stand alone application program. With certain of the described implementations, the user specifies retention policies by associating retention policies with directories of the file system including the archived files to implement a non-re-writable and non-erasable environment.

Additional Implementation Details

The archival file management system described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain described implementations, the user associates a retention policy with a directory by indicating a retention policy code in the name of the directory to apply to all files included in that directory. In alternative implementations, the user may associate a retention policy with a directory in a manner other than coding the pathname of the directory. For instance, the user may associate retention policies with the attributes defined for a directory of the file system, which may or may not be indicated in the name of the directory or graphical rendering of the directory in a graphical user interface providing a rendering of the hierarchical file system. In certain operating systems, such as the MICROSOFT WINDOWS operating system, the attributes that may be assigned to a directory are accessed by right clicking a mouse button over the name of the directory displayed in a user interface window to display a menu, and then selecting the properties option displayed in the menu. (Microsoft and Windows are registered trademarks of Microsoft Corporation).

In certain described implementations, the archival filter 10 is shown as a separate program component. The archival filter 10 may be installed separately from the file system 6, such as a separately installed application program that runs when the operating system 4 and file system 6 are initialized and screens files the user is attempting to erase or move. Alternatively, the functionality of the archival filter may be incorporated directly in the operating system and be made available as a feature of the file system installed with the operating system. The archival filter 10 may execute in the kernel of the operating system or at different priority levels.

In described implementations, a retention policy associated with a directory applied to all files within that directory, including files in subdirectories of the directory associated with the retention policy. In further implementations, certain subdirectories within the retention policy directory may include files not subject to the retention policy, such as the case with a hold directory grouping files that are retained indefinitely, irrespective of any retention policy associated with a directory in which the hold directory is included.

In described implementations, a non-re-writable and non-erasable type restriction policy is applied to files in a directory associated with the retention policy for the time period specified by the retention policy. In alternative implementation, different retention restrictions may be applied to files subject to the retention policy.

In described implementations, the coding of the retention policy in the directory pathname comprised a description of the retention policy. In alternative implementations, the coding of the retention policy in the pathname may comprise a code that is not descriptive of the retention policy. For instance, the pathname may be coded with "Retain3Years", which is a description of the retention policy, or a non-descriptive code, e.g., "X11", which may not provide any description of the actual retention policy.

FIGS. 3, 4, and 5 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 6:
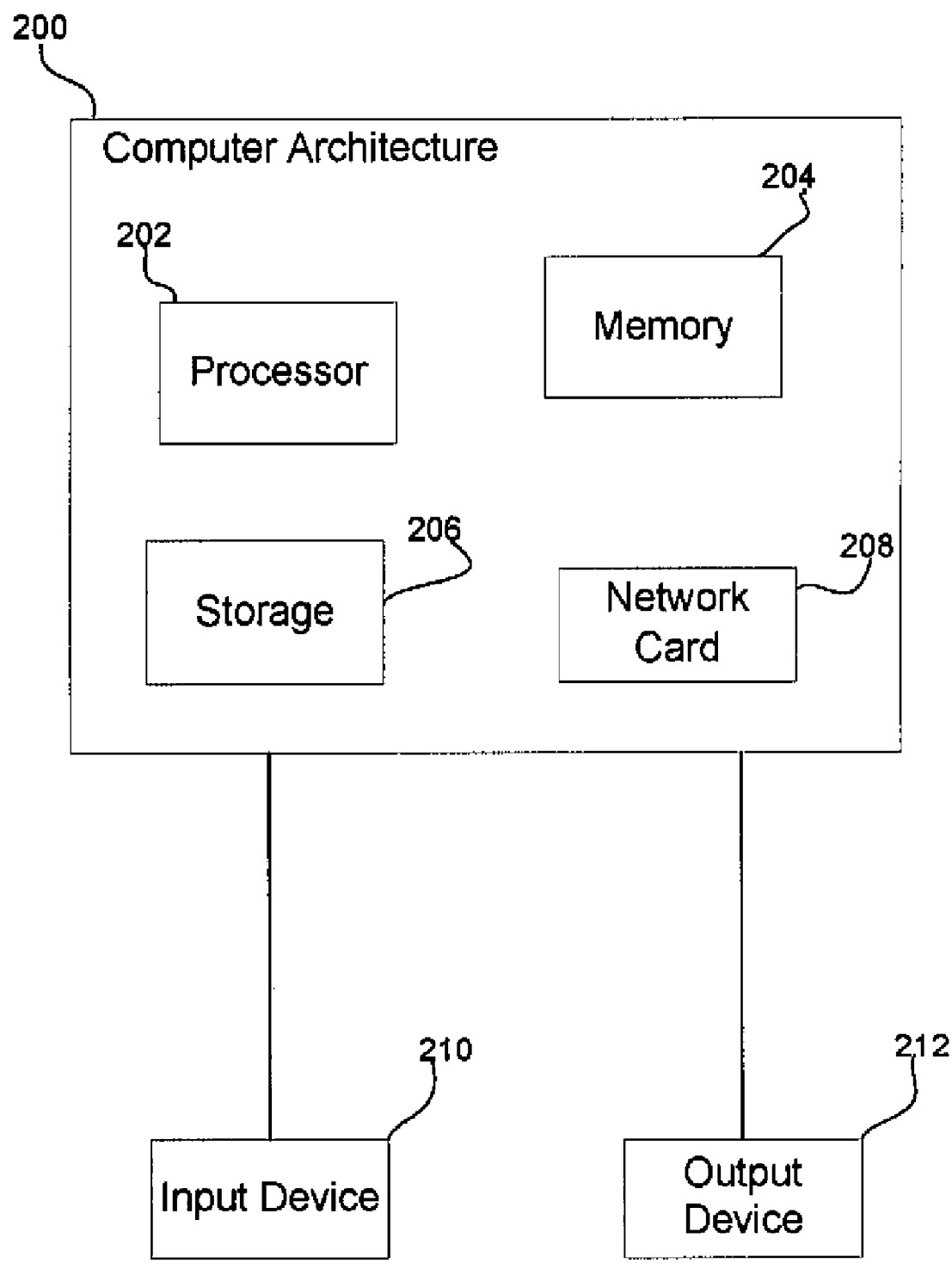
FIG. 6 illustrates a computing architecture that may be used to implement the computing environment described with respect to FIG. 1.

FIG. 6 illustrates one implementation of a computer architecture 200 of the host system 2 shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A computer implemented method for archiving files in a computer system, comprising:
   providing a hierarchical file system having directories in a computer readable storage medium;
   associating an archival retention policy with at least one of the directories in the hierarchical file system by including a description of the retention policy in a name of the at least one directory, wherein the retention policy indicated in the name of the directory applies to files included in the associated directory, and wherein the retention policy specifies a retention time indicating a time period during which a file is subject to the retention policy;
   receiving a request directed to a target file;
   determining whether the target file is included within the directory including a description of the retention policy in the name of the directory;
   determining whether the retention time of the retention policy indicates that the target file is currently subject to retention in response to determining that the target file is included within the directory whose name includes the description of the retention policy;
   applying the retention policy to the target file if the target file is currently subject to the retention policy; and
   determining whether the target file is included within the directory whose name includes a description of an unlimited retention that is a subdirectory of the directory associated with the retention policy, wherein the received request directed to the target file is not allowed to proceed if the target file is also included within one directory whose name includes the description of the unlimited retention even if the target file is not currently subject to the retention policy.

2. The method of claim 1, wherein including the description of the retention policy in the name of the at least one directory comprises including the description of the retention policy in a pathname of the directory in the hierarchical file system.

3. The method of claim 1, wherein the name of the directory including the description of the retention policy is displayed in a display of the hierarchical file system.

4. The method of claim 1, wherein the description of the retention policy included in the name of the directory specifies a time period of the retention.

5. The method of claim 1, further comprising:
receiving file system commands to include a file in the at least one directory associated with the archival retention policy, wherein using the file system commands to include the file in the directory subjects the included file with the archival retention policy associated with the directory.

6. The method of claim 1, further comprising:
processing by an archival filter program the description of the retention policy in the name of the directory to implement the retention policy.

7. The method of claim 1, wherein the time period comprises one of: a specified date, wherein the retention policy applies to files in the directory prior to the specified date; a specified time period, wherein the retention policy applies to each file in the directory for the specified time period following a time the file was modified; and an unlimited period of time.

8. The method of claim 1, wherein the retention policy applies up until the retention time, and wherein the retention policy applies to the target file if a current time is not greater than the retention time.

9. The method of claim 1, wherein the retention time specifies a time period, and wherein the retention policy applies to the target file if a current time is not greater than a time comprising a time the target file was last modified plus the specified time period.

10. The method of claim 1, wherein the request directed to the target file comprises a request to erase or move the target file, and wherein applying the retention policy comprises preventing the request to erase or move the target file from occurring.

11. The method of claim 1, wherein if the target file is not currently subject to the retention policy, then allowing the received request directed to the target file to proceed.

12. The method of claim 1, wherein additional subdirectories may be included in the directory associated with the retention policy, and wherein the retention policy applies to any file within the additional subdirectories.

13. The method of claim 1, wherein the directory associated with the retention policy is a subdirectory of another directory.

14. A system archiving files, comprising:
a processor;
a computer readable storage medium including:
  a hierarchical file system having directories in a computer readable medium;
  an archival retention policy associated with at least one of the directories in the hierarchical file system by including a description of the retention policy in a name of the at least one directory, wherein the retention policy indicated in the name of the directory applies to files included in the associated directory, and wherein the retention policy specifies a retention time indicating a time period during which a file is subject to the retention policy;
code executed by the processor to perform operations, the operations comprising:
  receiving a request directed to a target file;
  determining whether the target file is included within the directory including a description of the retention policy in the name of the directory;
  determining whether the retention time of the retention policy indicates that the target file is currently subject to retention in response to determining that the target file is included within the directory whose name includes the description of the retention policy;
  applying the retention policy to the target file if the target file is currently subject to the retention policy; and
  determining whether the target file is included within the directory whose name includes a description of an unlimited retention that is a subdirectory of the directory associated with the retention policy, wherein the received request directed to the target file is not allowed to proceed if the target file is also included within one directory whose name includes the description of the unlimited retention even if the target file is not currently subject to the retention policy.

15. The system of claim 1, wherein including the description of the retention policy in the name of the at least one directory comprises including the description of the retention policy in a pathname of the directory in the hierarchical file system.

16. The system of claim 1, wherein the name of the directory including the description of the retention policy is displayed in a display of the hierarchical file system.

17. The system of claim 1, wherein the description of the retention policy included in the name of the directory specifies a time period of the retention.

18. The system of claim 1, wherein additional subdirectories may be included in the directory associated with the retention policy, and wherein the retention policy applies to any file within the additional subdirectories.

19. An article of manufacture comprising a computer readable storage medium having code executed by a processor for archiving files by performing operations, the operations comprising:
providing a hierarchical file system having directories in a computer readable medium;
associating an archival retention policy with at least one of the directories in the hierarchical file system by including a description of the retention policy in a name of the at least one directory, wherein the retention policy indicated in the name of the directory applies to files included in the associated directory, and wherein the retention policy specifies a retention time indicating a time period during which a file is subject to the retention policy;
receiving a request directed to a target file;
determining whether the target file is included within the directory including a description of the retention policy in the name of the directory;
determining whether the retention time of the retention policy indicates that the target file is currently subject to retention in response to determining that the target file is included within the directory whose name includes the description of the retention policy;
applying the retention policy to the target file if the target file is currently subject to the retention policy; and
determining whether the target file is included within the directory whose name includes a description of an unlimited retention that is a subdirectory of the directory associated with the retention policy, wherein the received request directed to the target file is not allowed to proceed if the target file is also included within one directory whose name includes the description of the unlimited retention even if the target file is not currently subject to the retention policy.

20. The article of manufacture of claim 19, wherein including the description of the retention policy in the name of the at least one directory comprises including the description of the retention policy in a pathname of the directory in the hierarchical file system.

21. The article of manufacture of claim 19, wherein the name of the directory including the description of the retention policy is displayed in a display of the hierarchical file system.

22. The article of manufacture of claim 19, wherein the description of the retention policy included in the name of the directory specifies a time period of the retention.

23. The article of manufacture of claim 19, wherein additional subdirectories may be included in the directory associated with the retention policy, and wherein the retention policy applies to any file within the additional subdirectories.

* * * * *